United States Patent [19]

Weibler et al.

[11] Patent Number: 4,774,833
[45] Date of Patent: Oct. 4, 1988

[54] DEVICE FOR DETERMINING MASS FLOW AND DIRECTION OF FLOW

[75] Inventors: Wolfgang Weibler, Hofheim; Wolfgang Porth, Frankfurt am Main, both of Fed. Rep. of Germany

[73] Assignee: VDO Adolf Schindling AG, Frankfurt am Main, Fed. Rep. of Germany

[21] Appl. No.: 107,654

[22] Filed: Oct. 9, 1987

[30] Foreign Application Priority Data

Nov. 4, 1986 [DE] Fed. Rep. of Germany ....... 3637541

[51] Int. Cl.⁴ ............................................ G01M 15/00
[52] U.S. Cl. ............................... 73/118.2; 73/204.19; 73/204.24; 73/204.21
[58] Field of Search ................ 73/118.2, 204; 123/494

[56] References Cited

U.S. PATENT DOCUMENTS 4,199,981  4/1980  Young ................................. 73/204
4,548,077 10/1985  Van Patten ......................... 73/204

Primary Examiner—Jerry W. Myracle
Attorney, Agent, or Firm—Martin A. Farber

[57] ABSTRACT

In order to determine the correct mass flow of a rapidly pulsating stream of fluid, in particular in the intake duct 10 of an internal combustion engine, a device for determining the mass flow and the direction of flow is proposed which has a temperature sensor 17, a thermoelectric mass-flow sensor 16 and two temperature-measuring elements 12, 14 arranged adjacent said mass flow sensor. One temperature-measuring element 12 or 14 is located in the feed stream and the other temperature-measuring element 14 or 12 in the discharge stream of the thermal mass-flow sensor 16, depending on the direction of flow.

15 Claims, 2 Drawing Sheets

DEVICE FOR DETERMINING MASS FLOW AND DIRECTION OF FLOW

FIELD AND BACKGROUND OF THE INVENTION

The present invention relates to a device for determining the mass flow and direction of flow of a fluid of substantially directed flow with known mass flow, having a mass-flow measuring device provided with a thermoelectric mass-flow sensor and a temperature sensor and having at least one temperature-measuring element.

The fuel injection of internal combustion engines is controlled as a function of the mass flow of the intake air. For the measurement of the mass flow, use is made in many cases of a mass-flow measuring device which operates in accordance with the electrothermal principle. Such a measuring device is provided with at least one temperature sensor in order to compensate for the temperature, and with a mass-flow sensor the main component of which is an electrically heatable resistance element located in the mass flow. The heat removed from this heating element is a measure of the mass flow, more heat being removed the stronger the mass flow is.

Such a mass-flow measuring device is very insensitive with respect to the direction of the flow, since regardless of whether the flow is directed forward or backward, practically the same electric signal is given off corresponding to the heat removed. In other words, with a known mass-flow measuring device one can merely determine the amount of the mass flow but not its direction. It has now been found that, in the intake system of internal combustion engines, under certain operating conditions, oscillations of the air column occur and are superimposed on the constant flow so that a rapidly pulsating flow results therefrom. Depending on the revolutions per minute and the number of cylinders, the fundamental frequency of the oscillation is within the range of between 10 and 1000 Hertz. Depending on the velocity of flow and the amplitude of oscillation, reverse flows take place for short periods of time. In view of the above-described principle of measurement of the mass-flow measuring device, reverse flow produces the same measurement signal as intake flow, so that, in the final analysis, too large an amount of fuel is fed to the engine.

Direction-sensitive flow meters are known which have two resistance elements arranged on a common support member, the resistance elements being installed one behind the other in the direction of flow. Such prior-art flowmeters, however, are not suitable for detecting rapid changes in flow because of their inertia.

SUMMARY OF THE INVENTION

The object of the present invention is to create a rapidly responding device which can be located in the intake system of an internal combustion engine for the simultaneous determination of the mass flow and the direction of flow of a pulsating stream of air for the duration of one pulsation.

According to the invention, two temperature-measuring elements (12, 14) are arranged adjacent a thermal mass-flow sensor (16), the one temperature-measuring element (12 or 14) being arranged, depending on the direction of flow, in the feed stream and the other temperature-measuring element (14 or 12) in the discharge stream of the thermal mass-flow sensor (16).

In this way, the result is obtained that heat is transferred from the thermal mass-flow sensor to that temperature-measuring element which is arranged in the discharge stream, so that said element always has a higher temperature than the temperature-measuring element arranged in the feed stream does. As a result of the different temperatures, the two temperature-measuring elements give off different electric signals, the difference between which is positive or negative depending on the direction of flow.

In the preferred embodiment of the device of the invention, a thermal mass-flow sensor is provided in the center of the stream of fluid and one of the two temperature-measuring elements is arranged in front of the thermal mass-flow sensor in the path of the flow and one behind. The temperature-measuring elements are preferably arranged symmetrical to the thermal mass-flow sensor. Rapid response of the temperature-measuring elements is obtained in the manner that they themselves are of low inertia and that the distances to the thermal mass-flow sensor are small. The rapid response of the device is furthermore facilitated by the fact that it is arranged in the center of the flow.

A rapid and dependable mounting of the device is made possible if mass-flow sensor (16), temperature sensor (17) and the two temperature-measuring elements (12 and 14) have a common mount. In such case, the exact association in space of all elements is assured and the electric connection can be effected via a connecting cable having a single multiple plug. As mount there can be used, for instance, a switch board which has a lengthwise cutout, the switch board itself being arranged in the center of the mass flow. It is self-evident that the plane of the switch board is arranged parallel to the direction of flow. In this connection, the one end of the lengthwise cutout faces the on-coming fluid and the longitudinal axis of the lengthwise cutout extends precisely in the center of the flow. With this arrangement, the individual elements are advantageously arranged perpendicular to the direction of flow, bridging over the cutout in the board. It has proven particularly suitable to arrange the individual components in the following sequence, as seen in the direction of flow: temperature sensor, first temperature-measuring element, mass-flow sensor, second temperature-measuring element.

A reliable heat transfer from the thermal mass-flow sensor to the temperature-measuring element arranged in the discharge stream is obtained even with different velocities of flow if the thermal mass-flow sensor (16) and the temperature-measuring elements (12 and 14) associated with it are arranged in a region of laminar flow. Laminar flow can, for instance, be obtained in the manner that a "flow straightener," a body provided with parallel channels such as a honeycomb body, is arranged both in front of and behind the device.

The value of the signal given off by the two temperature-measuring elements is dependent not only on the direction of flow of the fluid but also on is velocity of flow as well as on the temperature of the thermal mass-flow sensor. An improvement in the uniformity of the sensitivity is obtained if the temperature of the mass-flow sensor is controlled in a manner known per se. In this case, its temperature is regulated to a constant absolute value or else to a constant difference from the temperature of the incoming fluid, the temperature of the latter being determined by the temperature sensor.

In accordance with the invention it is proposed that the temperature-measuring elements (12, 14) be developed as temperature-dependent resistance elements which are arranged as voltage divider in a bridge circuit (12, 14, 42, 44). In this connection, changes in temperature result in changes in resistance and the latter lead to the detuning of the bridge circuit, so that the voltage tapped off on the bridge diagonals is positive or negative depending on the direction of flow.

Metallic resistance elements (12, 14) of positive temperature coefficient (PTC) and high stability such as nickel or platinum are particularly advantageous because they can be developed as thin wires, sheets of films. Resistance elements (12, 14) of negative temperature coefficient (NTC) are advantageous when large temperature coefficients and thus large sensor signals are particularly important.

A rapid response of the resistance elements is assured if these resistance elements (12, 14) are developed in wire form. In such case, the resistance elements are arranged freestanding in the flow. The mass inertia and thus the response time of a resistance element can be controlled by the cross-section of the wire. By "wire" there is to be understood here any elongated development of the resistor, its cross section being round, polygonal or flat. Particularly in the case of thin wires, which permit a rapid response, consideration must be given to the mechanical stability. The arrangement can be both in elongated form and in meandering form or spirals, the plane of the meanderings or spirals being preferably in the longitudinal direction of the flow.

It has proven suitable to develop resistance elements (12, 14) in sheet shape, the resistance layer being applied on a substrate of low thermal capacitance and low thermal conductivity.

Such resistance elements can, in particular, be integrated into miniaturized components.

It has also proven suitable to use the signal of the mass-flow measuring device to control the feed voltage of the bridge circuit (12, 14; 42, 44). In this way, the feed voltage is advantageously lowered in a case of high flow, this giving a uniform amplitude of signal within the entire measurement range. This is advisable in particular upon operation of the device of the invention in the intake system of an automobile which is to operate suitable at an air temperature of −40° C. in winter as well as an air temperature of more than +60° C. in midsummer.

Further according to the invention, there is a unit (50) for regulating the feed voltage of the bridge circuit (12, 14; 42, 44) for establishing a sensitivity which is uniform over the entire flow range.

Also the regulating unit (50) can be connected to the mass-flow measuring device (66).

In a further embodiment of the invention, it is proposed that thermocouples (112, 114) be provided as temperature-measuring elements. Thermocouples have the advantage that they are suitable for point temperature detection and are insensitive to mechanical stresses in the event of small three-dimensional size.

According to a feature of the invention, the thermocouples (112, 114), arranged in front of and behind the heating element (16) respectively, are connected electrically in series with opposite polarity.

The information as to the direction of flow of the fluid is derived from the temperature difference of the two temperature-measuring elements. When using thermocouples, it is therefore advantageous to connect two legs of identical electric polarity of the two thermocouples directly to each other within the device so that only one leg each of each thermocouple is brought out. In this way, only the difference voltage of the two thermocouples is present between these two legs. Since both legs are made of the same material, thermal stresses which occur on electric connecting elements are automatically compensated for. In order to obtain a high thermal voltage, a plurality of thermocouples can be connected one behind the other to form a thermocouple battery if a point temperature measurement is not necessary.

In another development of the invention, it is proposed that the device of the invention be integrated in the circuit of a known device for controlling the fuel injection, especially for an internal combustion engine, as a function of the mass flow of the air drawn in, the fuel being fed as a function of the signals given off by the temperature-measuring elements (12, 14). In this way it is possible to reduce the excessively large amount of fuel which enters under certain operating conditions as soon as a return flow is noted in the intake system of the combustion engine via the device of the invention.

One particularly advantageous embodiment of the arrangement according to the invention is present if the temperature-measuring elements are connected to the input of an amplifier (52) the output of which is connected, via a Schmitt trigger (54), to the input (60) of a control unit (64) which is connected by a second input (62) furthermore to the mass-flow measuring device (66) and is connected on the output side to a fuel-metering device (70). In this connection, the measurement signal given off by the known mass-flow measuring device to the, also known, fuel-metering device is controlled, in accordance with the invention, by the correction signal which is dependent on the direction of flow. Since the two signals are subject to continuous changes in a rapidly pulsating stream of intake air, the direction-dependent correction signal is fed via the Schmitt trigger, as threshold-value switch, in order to suppress an unnecessary build-up of the regulating circuits in the case of small signal levels.

It has furthermore been found suitable to smoothen the output signal of the control unit which is subject to pulsation by means of an integrator before its entrance into the fuel-metering device.

According to the invention, an integrator (68) is arranged between the output of the control unit (64) and the input of the fuel metering device (66).

If the mass-flow measuring device and the temperature-measuring elements have different response times, it may happen that the corresponding signals arrive shifted in time with respect to each other. It is then advisable to arrange a phase shifter (54) between the output of the Schmitt trigger (54) and the input (60) of the control unit (64). If, in special cases, a period of time of influencing of the measurement signal is desired which is different from the period of time of the correction signal, then it is advantageous to arrange a monostable flip-flop (58) in front of the input (60) of the control unit (64). In this way, a short entering pulse can be correspondingly lengthened or even shortened.

Fundamentally the correction signal can act in different ways on the measurement signal. In this connection, it has proven advantageous if a correction signal is given off only if a reverse flow takes place, i.e. if no signal is given off to the control unit in the event of flow in the intake direction. The correction signal can act basically in three particularly advantageous manners on the measurement signal.

1. The control unit can suppress the measurement signal coming from the mass-flow measuring device (66) for as long as the correction signal is present on the second input (60) of the control unit. In this simple way, unnecessary, injurious overdosing of the fuel can be avoided. It is self-evident that, particularly in the case of such a device, an integrator which smooths the output signal is of particular importance.

2. The control unit (64) can subtract the value of the measurement signal found during the duration of a correction signal present on the input (60) from that value of the measurement signal which is found during the time of absence of the correction signal. This theoretically correct control presupposes that both the mass flow and the direction of flow are completely without inertia and are determined under indentical measurement conditions. This can be achieved in practice only at very great expense. Thus the mass-flow measuring device also has an integrating character since the air heated upon the reverse flow by the measuring element again moves over the measuring element after change to normal direction of flow, and thus cools it less. Accordingly, the control described below has been found to be the most economical.

3. The control unit (64) can reduce the value of the measurement signal found during the time that a correction signal is present on the input (60) to a predetermined fraction. By the establishing in advance of this fraction as well as the variation thereof as a function of the mass flow and/or of the speed of rotation of the engine, optimal adaptation is possible to the different operating states and the technical characteristics of the measuring devices.

A particularly compact and service-friendly embodiment of the device of the invention is obtained if, in addition to the sensors (16 and 17) and measuring elements (12 and 14), the electronic components (42-68) are also arranged on a common mount. It is therefore proposed that all electronic components, in addition to the sensors and measuring instruments, be arranged on the above-described board. In this connection, these components (42-68) are advantageously combined in a single measuring and control unit (5) which can be arranged on a microchip. With this arrangement, all components can be adapted individually to each other. Here particular mention should be made of the balancing of the bridge circuit and the adaptation of the correction value to the measurement signal. Such an electrical and mechanical unit is completely replaced in the event of a breakdown, without further work in the shop being required. Such a unit need merely be connected electrically to a source of current and to the fuel-metering device. At most, connection to a speed transmitter might possibly be necessary.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
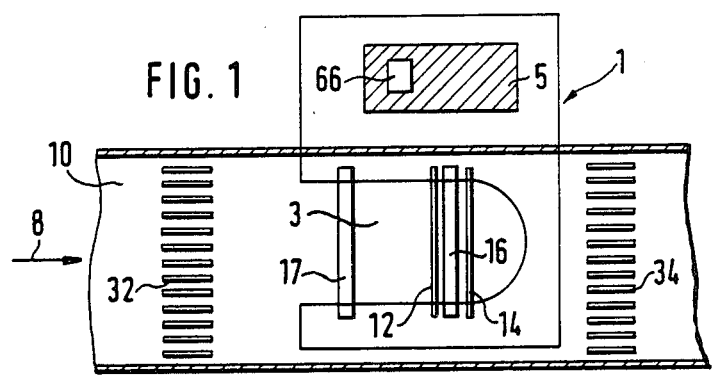
FIG. 1 shows, in diagrammatic side view, an arrangement of one embodiment of the device of the invention.

FIG. 1 shows the geometrical arrangement of a device according to the invention in a flow channel 10. The direction of flow is indicated by an arrow 8. Seen in the direction of flow, there is first of all a flow-independent temperature sensor 17 and behind it a heated thermal mass-flow sensor 16. Both sensors are associated with a mass-flow measuring device 66 which is integrated in a measurement and regulating unit 5. The signal of the mass-flow measuring device, however, does not permit recognition of direction, and in all cases there is only a cooling of the heated sensor. In order to recognize the direction of flow, temperature-measuring elements 12 and 14 are arranged in front of and behind the thermal mass-flow sensor 16, as seen in the direction of flow, said measuring elements being shown diagrammatically in FIG. 1 as resistance wires which extend parallel to the lengthwise direction of the thermal mass-flow sensor 16.

The temperature-measuring elements 12 and 14 are arranged symmetrical to the thermal mass-flow sensor 16. If the flow is, for instance, from left to right in FIG. 1, then the temperature-measuring element 12 is encircled by the uninfluenced feed stream of the fluid while the temperature-measuring element 14 lies in the discharge stream from the thermal mass-flow sensor 16. Thus in this case the temperature-measuring element 14 is additionally heated. Upon the reverse direction of flow, namely from right to left, the conditions of flow at the temperature-measuring elements are reversed and thus the reverse change in their electrical properties takes place. In order to avoid the influence of turbulence, "flow straighteners" 32 and 34 are arranged on both sides of the device. These flow straighteners are honeycomb-shaped bodies having numerous parallel channels of flow. In this way, assurance is had that the measuring device proper is always acted on by laminar flow.

The temperature sensor 17, first temperature-measuring element 12, mass-flow sensor 16 and second temperature-measuring element 14 are arranged—seen in the direction of flow—together in this order on a mount 1. As mount 1, there is provided a board on which the connecting lines (not shown here) for the individual sensors or measuring elements are arranged. The plane of the mount 1 is parallel to the direction of flow. The mount has a U-shaped elongated cutout 3 the open end of which faces the incoming fluid and a longitudinal axis of which is arranged in the center of the flow. The sensor 16 and 17 as well as the measuring elements 12 and 14 bridge over the cutout and their ends are connected to the sections of the mount 1 which surround the cutout. The sensors 16 and 17 and the measuring elements 12 and 14 are preferably perpendicular to the direction of flow of the fluid.

Outside the flow channel 10, the electronic measurement and control unit 5, into which the mass-flow measuring device 66 is integrated, is arranged on the mount 1 which is developed as board.

Figure 2:
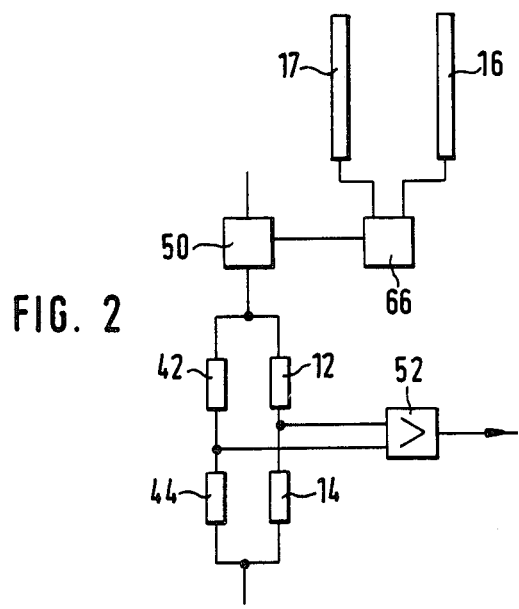
FIG. 2 is a diagrammatic wiring diagram of a bridge circuit of the device of the invention, with temperature-dependent resistors.

In FIG. 2, the resistors of a bridge circuit are marked 12 and 14 and 42 and 44 respectively, the resistors 12 and 14 and the resistors 42 and 44 being connected as voltage dividers. The bridge circuit is fed via the voltage/current source 50. The resistors 42 and 44 are fixed resistors and the resistors 12 and 14 are temperature-dependent resistance elements which are arranged in the flowing fluid in positions differing from each other with respect to the mass-flow sensor. Accordingly, the temperature-dependent resistance elements 12 and 14 are heated to a different extent by the flow, so that the resistances vary to a different extent. In this way a voltage difference is produced in the bridge diagonals at the measurement points between the resistors 42 and 44 and between the resistance elements 12 and 14 respectively. A correction signal is formed via an amplifier 52 from said voltage difference.

The feed voltage for the bridge circuit which is given off by the source of voltage 50 is controlled as a function of the measurement signal of the mass-flow measuring device 66.

Figure 3:
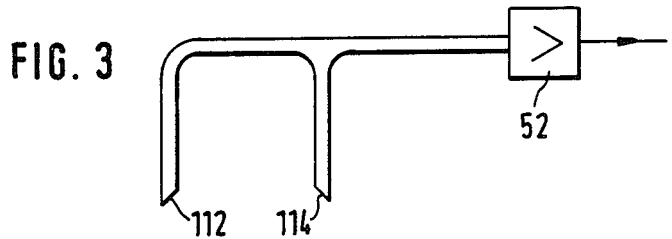
FIG. 3 is a diagrammatic wiring diagram of another embodiment of the device of the invention, with thermocouples.

In FIG. 3, thermocouples designated 112 and 114 are provided as temperature-measuring elements 12, 14 in an arrangement in accordance with FIG. 1. The two thermocouples are directly connected to each other by one leg each of the same polarity, the two other legs being connected to an amplifier 52. In this way, only the difference signal of the two thermocouples 112, 114 which serves for the recognition of the direction of flow is fed to the amplifier 52. The advantage of the use of thermocouples resides not only in their rapid response but also in the fact that the measurement signal is available independently of any external source of current. Thermocouples can be manufactured particularly economically and in many different forms with high signal by thin-layer and semiconductor techniques.

In the embodiment shown, thermocouples of copper-constantin are used, several pairs being connected one behind the other so as to form a battery of thermocouples in order to obtain a higher thermoelectric voltage.

Figure 4:
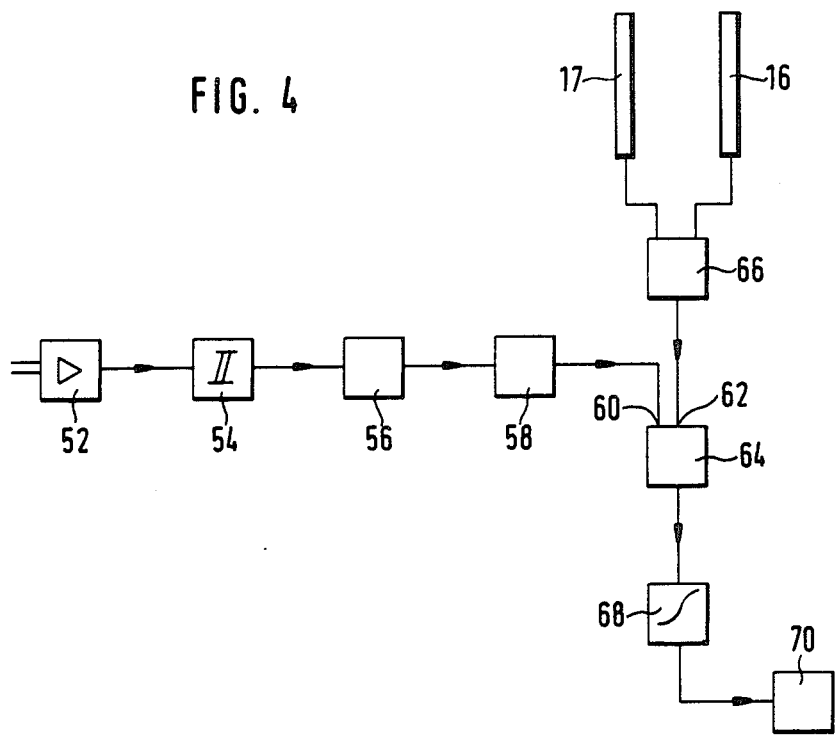
FIG. 4 is a diagrammatic circuit arrangement for controlling the fuel metering device in a further variant of the device of the invention.

FIG. 4 diagrammatically shows a further path of a correction signal given off by the amplifier 52. A Schmitt trigger which serves as threshold-value switch, on the one hand, screens out, signals which are too low and, on the other hand, forwards a constant signal, regardless of the value of the input signal. The output of the Schmitt trigger 54 is connected to an input 60 of a control unit 64. At another input 62 of the control unit 64, the measurement signal of the mass-flow measuring device 66 is received. The output of the control unit 64 is connected to a fuel-metering device 70. The pulsations of the mass flow which lead to pulsating signals are smoothed out by means of an integrator 68. Since mass-flow measuring device 66 and the temperature-measuring elements 12 and 14 serving for the recognition of direction have different response times, a phase shifter 56 is provided which synchronizes the signals. For the correction of the pulse length of the measurement signals, there is furthermore provided a monostable flip-flop 58 which makes it possible to control the pulse duration of the correction signal differently from the pulse length of the input signal.

The purpose of the control unit 64 is to adapt a signal given off to the fuel-metering device, which signal is influenced primarily by the mass-flow measuring device, in accordance with the correction signal. Depending on the correction signal, which appears only upon the reverse flow, the measurement signal of the mass-flow measuring device which is received during this phase of the pulsation is either suppressed by the control unit or subtracted from the value of the measurement signal received during the rest of the phase; or the measurement signal is reduced to a fraction lying between the measurement value and zero, the value of the fraction being dependent both on the speed of rotation of the engine and on the value of the mass flow.

The electronic components 42 to 68 are combined to form the measurement and control unit 5 and are developed integrally as microchip or by hybrid technology. This microchip is arranged on the board shown in FIG. 1 which serves as mount 1 and is connected directly to the sensors 17 and 16 as well as to the measuring elements 12 and 14.

We claim:

1. In a device for determining the mass flow and direction of flow of a fluid of substantially unidirectional flow with known mass flow, the device having a mass-flow measuring unit provided with a thermoelectric mass-flow sensor and a temperature sensor, the improvement wherein the device comprises
    two temperature-measuring elements arranged adjacent the mass-flow sensor;
    one of said temperature-measuring elements being located, depending on the direction of flow, in a feed stream; and
    the other of said temperature-measuring elements being located in the discharge stream of the mass-flow sensor.

2. The device according to claim 1, further comprising
    a common mount for said mass-flow sensor, said temperature sensor and said two temperature-measuring elements.

3. The device according to claim 2, wherein
    said mass-flow sensor and said temperature-measuring elements associated therewith are located in a region of laminar flow.

4. The device according to claim 1, wherein
    said mass-flow sensor and said temperature-measuring elements associated therewith are located in a region of laminar flow.

5. The device according to claim 1, further comprising
    a bridge circuit; and wherein
    said temperature-measuring elements are temperature-dependent resistance elements which are connected as a voltage divider in said bridge circuit.

6. The device according to claim 5, wherein
    said resistance elements have a positive temperature coefficient.

7. The device according to claim 6, wherein
    said resistance elements are in wire form.

8. The device according to claim 6, wherein
    said resistance elements are constructed as foil.

9. The device according to claim 5, wherein
    said resistance elements have a negative temperature coefficient.

10. The device according to claim 9, wherein
    said resistance elements are in wire form.

11. The device according to claim 9, wherein
    said resistance elements are constructed as foil.

12. The device according to claim 5, further comprising a regulating means for regulating a feed voltage of said bridge circuit for establishing a sensitivity which is uniform over the entire flow range.

13. The device according to claim 12, wherein said regulating means is connected to said mass-flow measuring unit.

14. The device according to claim 1, wherein said temperature-measuring elements are thermocouples.

15. The device according to claim 14, wherein said thermocouples are connected electrically in series with opposite polarity.

* * * * *